June 4, 1929. R. A. SHETZLINE 1,715,475
ELECTRICAL PROTECTIVE SYSTEM
Filed Dec. 29, 1924

INVENTOR
R. A. Shetzline
BY
ATTORNEY

Patented June 4, 1929.

1,715,475

UNITED STATES PATENT OFFICE.

ROY A. SHETZLINE, OF NEW YORK, N. Y., ASSIGNOR TO AMERICAN TELEPHONE AND TELEGRAPH COMPANY, A CORPORATION OF NEW YORK.

ELECTRICAL PROTECTIVE SYSTEM.

Application filed December 29, 1924. Serial No. 758,782.

This invention relates to electrical protective devices, and particularly to devices characterized by means to restore them to their normal non-operated condition after they have operated.

A protective device having an air gap which breaks down at a predetermined potential, has long been used in the telephone art for the protection of circuits from high voltages set up therein by sources extraneous to the circuits themselves. One of the difficulties experienced with a protector of this type arises from its occasional failure to restore itself to its normal non-operated condition after it has operated to provide a low resistance path to ground for the current set up by the interfering voltage. This failure of the protector to restore itself to its normal non-operated condition results in increased maintenance costs upon the circuit and also increases the length of time during which the circuit may be out of use. It has been found that failure of a protector to automatically restore itself occurs principally when the protector is required to drain an abnormally large current for a relatively long time. The continued flow of large currents causes a burning or fusing of the electrodes of the air gap, which effectively bridges the gap.

It is the object of this invention to provide a system for the protection of circuits against high voltages, which is characterized by the ability of the protective devices to automatically restore themselves to their normal non-operated condition after an electrical discharge has taken place through them.

Figure 1:
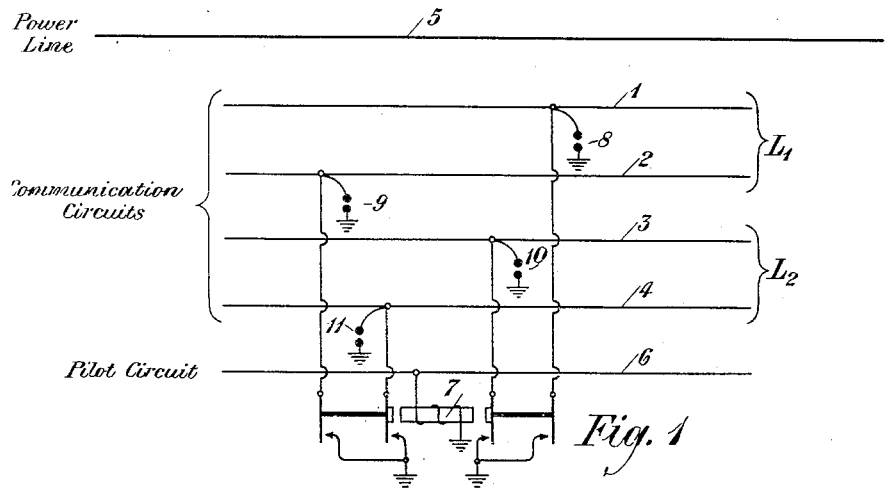
Figure 2:
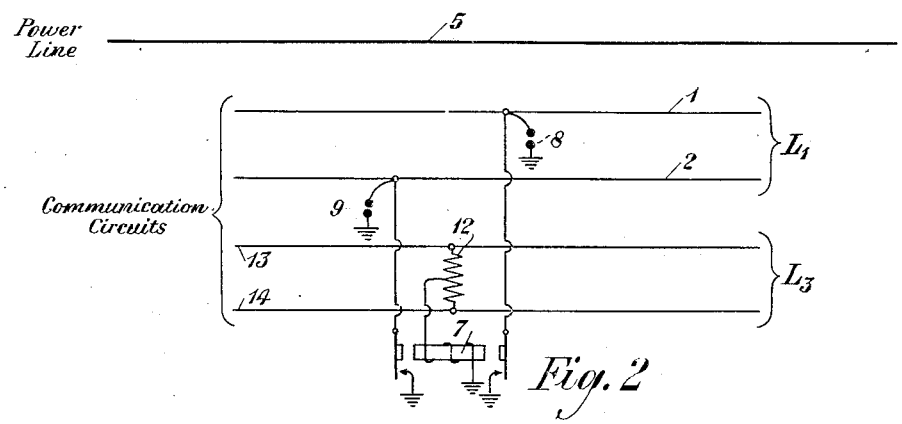
Figure 3:
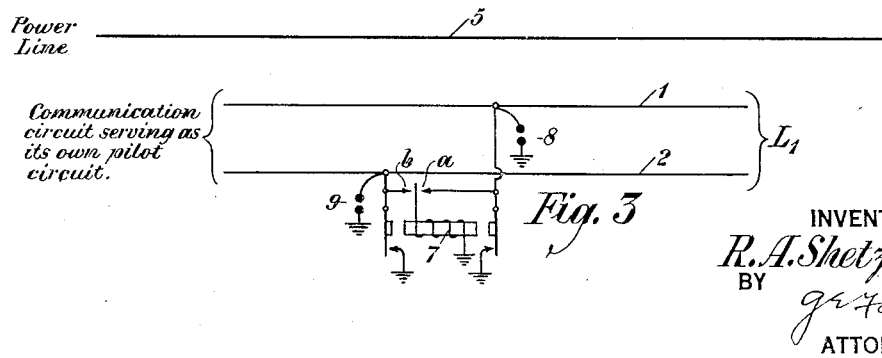

This invention will be clearly understood from the following description, read in connection with the attached drawing, of which Figure 1 shows schematically a general form of embodiment of the invention; Fig. 2 shows a form of the invention in which a communication circuit acts as a pilot circuit for the operation of the protective system without impairing its usefulness as a metallic communication circuit; and Fig. 3 shows an arrangmement in which the communication circuit to be protected acts also as its own pilot circuit.

In Fig. 1 the communication circuit $L_1$, made up of conductors 1 and 2, and the communication circuit $L_2$, made up of conductors 3 and 4, are to be protected against abnormal voltages to ground set up therein by an extraneous source such as power line 5. The pilot circuit 6 is preferably a wire on the same pole line or in the same cable as the circuits to be protected so that the same interfering voltage to ground would be set up in the pilot circuit as in the communication circuits $L_1$ and $L_2$. Connected with the pilot circuit is a relay 7, which is of a type that will quickly respond to a voltage in the vicinity of that required to operate protectors and not respond to voltages much below that which usually operates the protectors. Each wire of a communication circuit is connected with an armature of relay 7. The contacts of these armatures are connected to ground. Connected with the wires 1, 2, 3 and 4 of the communication circuits are the air-gap protective devices 8, 9, 10 and 11, which may be of any well-known type used for the protection of communication circuits. These devices would normally be connected with the wires to be protected at substantially the same point at which the wires are connected with the armatures of relay 7.

The manner in which the before-described system operates for the protection of the communication circuits is as follows: the pilot wire 6 which, as stated, is grouped with the communication circuits; that is to say, upon the same pole-line in the case of open-wire circuits, or within the same sheath as the communication circuits in the case of cable circuits, has therefore induced therein substantially the same transient voltage as the communication circuits. This transient voltage in the pilot circuit energizes relay 7, which, if sufficiently high to cause its operation grounds the wires of the communication circuits. The time required to operate a relay of the type described is very brief, namely, of the order of 1/100 of a second. During the interval in which relay 7 is getting ready to operate, the protective devices 8 to 11, inclusive, connected with the wires of the communication circuits $L_1$ and $L_2$, will operate as the result of the transient voltage set up in those wires and will relieve the communication circuits of the high voltage. The current will continue to flow across the air gaps of these protectors only during the interval required to energize and operate relay 7, which as stated, is very short. Precautions must be taken to the end that the operation of the relay will not be prevented by the reaction upon the pilot circuit of the induced current in the communication circuit. This may be effected by design or adjustment of the relay, or by various means external to but closely associated with the relay. In using the invention on open wire circuits the pilot circuit may be placed sufficiently far from the circuits to be protected so as not to be appreciably affected by current induced in the communication circuits, and yet close enough so that the induced voltage in the pilot circuit will be proportional to that in the communication circuits. It will be seen that as soon as relay 7 operates the wires are directly grounded, which of course diverts the flow of current away from the protectors, inasmuch as the path of ground through the armatures of the relay is of lower resistance.

In the arrangement shown in Fig. 1 the pilot circuit which controls the protecting relay is not intended to be used for any other purpose. In Fig. 2 there is shown a way in which a communication circuit acts not only for the transmission of signals but also serves as a pilot circuit for the operation of the protecting relay. In this figure the communication circuit $L_1$ is to be protected and the circuit $L_3$ serves not only as the pilot circuit for the control of the protective relays, but also transmits signals. This double functioning of the circuit $L_3$ is effected by means of a retard coil 12 which is bridged across the line $L_3$ and is of such character as not to impair the transmission of the telephone current flowing through the said line. The midpoint of the retard coil is connected with the winding 7. When a transient voltage is set up in conductors 1 and 2 of circuit $L_1$ by the power line 5 a similar voltage will be set up in conductors 13 and 14 of the line $L_3$. The current resulting therefrom will flow to the midpoint of the retard coil 12 and thence through the winding of relay 7, causing the relay to operate and to ground conductors 1 and 2 of circuit $L_1$. The effect of the operation of relay 7 is to diminish the current flow through protectors 8 and 9. While I have shown only one circuit protected by this arrangement, namely $L_1$, it is to be understood of course that any number of circuits might be similarly protected. While Figs. 1 and 2 show two forms of pilot circuits, pilot circuits might be derived in other ways, as for example, by simplexing a phantom group of circuits, or in the case of cable circuits by utilizing the sheath of the cable as the pilot conductor. Furthermore, the pilot circuit might be a part of the power system which induces the voltage in the communication circuits, in which case, the relay would work on excessive power currents or voltages, rather than upon induced voltages.

Fig. 3 shows a system in which a communication circuit serves also as its pilot circuit for its own protection. In this circuit the conductors 1 and 2 are connected with the armatures of relay 7 as in the arrangements shown in the preceding figures. These conductors are also connected with the winding of the relay through air gaps, conductor 1 being connected through gap $a$ and conductor 2 through gap $b$. These gaps should be so designed and of such material as not to freeze when discharge takes place. The principle upon which this operates is quite apparent. A high voltage set up in conductors 1 and 2 by the power line 5 will, if of sufficient magnitude, break down the air gaps $a$ and $b$ and cause a flow of current through relay 7. This will cause the relay to operate, thereby grounding the conductors 1 and 2 through the contacts of the relay. The relay should be of a type which when once operated slowly restores itself to normal condition. This would hold the armatures of the relay against their contacts after the current flow through the air gaps $a$ and $b$ diminished.

The invention has been shown in the drawing in the form applicable to the protection of circuits against high induced voltages to ground. The invention is not, however, limited to the protection against such voltages, and it is capable of protecting against high induced voltages between wires.

While this invention has been disclosed as embodied in particular forms, it is to be understood that it is capable of embodiment in other forms without departing from the spirit and the scope of the appended claims.

What is claimed is:

1. In an electrical protective system the combination with a line circuit to be protected from voltages set up by an extraneous source of a protecting circuit exposed to the same extraneous source of voltage, an air gap protective device connected with the line circuit and adjusted to operate at a predetermined voltage, and a relay connected with the protective circuit and operated by induced voltages exceeding any desired magnitude, the said relay having means to connect the said line circuit to ground through a path in parallel to the said protective device.

2. In an electrical protective system the combination with a circuit to be protected, of an air gap connected thereto to provide a path to ground for voltages exceeding a predetermined limit, a second circuit, also exposed to the same interference as the circuit to be protected, having connected thereto a relay adjusted to operate within a predetermined time upon a predetermined voltage, the said relay having means to provide drainage paths from the said first circuit to ground in parallel with the said air gap.

3. In an electrical protective system, the combination with a line circuit to be protected against voltages created by a source extraneous to the said line circuit, of an air gap protective device connected with the said line circuit, and a second circuit also exposed to the same extraneous source of voltage and having a relay therein operatively independent of the said protective device, the said relay having its winding connected with the said second circuit and having its armature and contact connected between said line circuit and ground to provide a path to ground from the said line circuit in parallel with and of lower resistance than the path provided by the said protective device.

In testimony whereof, I have signed my name to this specification this 23rd day of December, 1924.

ROY A. SHETZLINE.